(12) United States Patent
Hashimoto

(10) Patent No.: US 10,037,102 B2
(45) Date of Patent: Jul. 31, 2018

(54) TOUCH PANEL

(71) Applicant: LG ELECTRONICS INC., Seoul (KR)

(72) Inventor: Masashi Hashimoto, Seoul (KR)

(73) Assignee: LG ELECTRONICS INC., Seoul (KR)

(*) Notice: Subject to any disclaimer, the term of this patent is extended or adjusted under 35 U.S.C. 154(b) by 41 days.

(21) Appl. No.: 14/915,007

(22) PCT Filed: Aug. 25, 2014

(86) PCT No.: PCT/KR2014/007881
§ 371 (c)(1),
(2) Date: Feb. 26, 2016

(87) PCT Pub. No.: WO2015/030444
PCT Pub. Date: Mar. 5, 2015

(65) Prior Publication Data
US 2016/0224174 A1    Aug. 4, 2016

(30) Foreign Application Priority Data

Aug. 30, 2013  (KR) .................. 10-2013-0103720

(51) Int. Cl.
*G06F 3/041* (2006.01)
*G06F 3/044* (2006.01)
*G06F 3/0354* (2013.01)

(52) U.S. Cl.
CPC ........ *G06F 3/0416* (2013.01); *G06F 3/03545* (2013.01); *G06F 3/044* (2013.01)

(58) Field of Classification Search
CPC ..... G06F 3/03545; G06F 3/0416; G06F 3/044
See application file for complete search history.

(56) References Cited

U.S. PATENT DOCUMENTS

| | | | |
|---|---|---|---|
| 5,790,106 A * | 8/1998 | Hirano | G06F 3/041 178/18.06 |
| 5,792,997 A * | 8/1998 | Fukuzaki | G06F 3/046 178/18.07 |
| 7,868,873 B2 | 1/2011 | Palay et al. | |
| 8,022,937 B2 | 9/2011 | Palay et al. | |
| 8,102,382 B2 | 1/2012 | Palay et al. | |
| 9,310,943 B1 * | 4/2016 | Omelchuk | G06F 3/044 |
| 2007/0177533 A1 | 8/2007 | Palay et al. | |
| 2008/0181143 A1 | 7/2008 | Palay et al. | |
| 2011/0298421 A1 | 12/2011 | Palay et al. | |

(Continued)

FOREIGN PATENT DOCUMENTS

| | | |
|---|---|---|
| JP | 4866941 B2 | 2/2012 |
| KR | 10-2011-0027208 A | 3/2011 |

(Continued)

*Primary Examiner* — Hong Zhou
(74) *Attorney, Agent, or Firm* — Birch, Stewart, Kolasch & Birch, LLP

(57) ABSTRACT

A touch panel includes an electrostatic sensor unit in which a plurality of TX lines and RX lines intersect with each other to detect a touch position electrostatically, and a power supply unit configured to selectively apply an AC voltage to the TX lines and the RX lines to induce capacitive coupling between an external LC circuit and the electrostatic sensor unit.

12 Claims, 9 Drawing Sheets

(56) References Cited

U.S. PATENT DOCUMENTS

| | | | | |
|---|---|---|---|---|
| 2012/0169641 A1* | 7/2012 | Wang | ................... | G06F 3/044 |
| | | | | 345/173 |
| 2012/0327041 A1* | 12/2012 | Harley | ................ | G06F 3/03545 |
| | | | | 345/179 |
| 2013/0063388 A1* | 3/2013 | Ningrat | .................. | G06F 3/044 |
| | | | | 345/174 |
| 2013/0207926 A1* | 8/2013 | Kremin | ................ | G06F 3/0383 |
| | | | | 345/174 |
| 2013/0300708 A1* | 11/2013 | Kim | ..................... | G06F 3/0416 |
| | | | | 345/174 |
| 2014/0104224 A1* | 4/2014 | Ih | ........................... | G06F 3/044 |
| | | | | 345/174 |
| 2014/0184554 A1* | 7/2014 | Walley | ................. | G06F 3/0416 |
| | | | | 345/174 |

FOREIGN PATENT DOCUMENTS

| | | | |
|---|---|---|---|
| KR | 10-2011-0136953 A | 12/2011 | |
| KR | 10-2013-0095451 A | 8/2013 | |

\* cited by examiner

TOUCH PANEL

CROSS REFERENCE TO RELATED APPLICATIONS

This application is the National Phase of PCT International Application No. PCT/KR2014/007881, filed on Aug. 25, 2014, which claims priority under 35 U.S.C. 119(a) to Patent Application No. 10-2013-0103720, filed in the Republic of Korea on Aug. 30, 2013, all of which are hereby expressly incorporated by reference into the present application.

TECHNICAL FIELD

The present disclosure relates to a position detecting device, and particularly, to a touch panel capable of supplying power to a stylus pen and a position detecting device including the touch panel.

BACKGROUND ART

Touch panels are used to input, to cell phones or personal computers, texts or images besides operational commands. Touch panels perform signal processing for converting a sensed touch of a finger or a stylus pen into an electric signal.

Some stylus pens equipped with electronic circuits may perform not only a function of simple touch input but also a function of a mouse such as selecting or dragging a part of an image by generating an electric signal.

When a stylus pen is equipped with an electronic circuit as described above, power is required for operating the electronic circuit of the stylus pen. A stylus pen may be further equipped with a battery for supplying power thereto. However, recently, a body of a cell phone is provided with a dedicated panel for supplying power so that the power supply panel may wirelessly supply power to a stylus pen. Such a wireless power supply technology is disclosed in Patent Document 1.

(Patent Document 1) JP4866941 B

Patent Document 1 discloses a power supply technology in which power is transferred to a coil of a stylus pen by an induction coil of a power transmission device 4 disposed under an LCD module 3 in a smartphone, as illustrated in FIG. 1. For reference, FIG. 1 exemplarily illustrates a smartphone including an external protective cover 1, a touch panel 2 disposed under the protective cover 1, the LCD module 3 disposed under the touch panel 2, the power transmission device 4 disposed under the LCD module 3 to transfer power by the induction coil, and a frame 5 forming an outer shape of the smartphone.

Although described in embodiments of the present disclosure, the protective cover 1 may not be an essential element since the protective cover 1 is integrated with the touch panel 2 according to a recent trend.

A position detecting device such as a smartphone includes an additional circuit disposed under an LCD module in order to supply power to a stylus pen, but such an additional circuit panel for supplying power causes an increase in cost. Furthermore, it causes an increase in the thickness of a cell phone, degrading a commercial value thereof.

In particular, the wireless power supply technology disclosed in Patent Document 1 is described below.

A resonance induction circuit installed at a power transmission side (power transmission device) converts power energy into electromagnetic energy and radiates it as electromagnetic waves into space.

A power reception side (stylus pen) receives the electromagnetic energy through a resonance induction circuit installed at the power reception side. Here, there is a condition of electromagnetic coupling or inductance coupling between an inductance component of a coil of the power transmission side and an inductance component of a coil of the power reception side.

SUMMARY OF THE INVENTION

Embodiments provide a device and method for supplying power from a smart device such as a smartphone or a tablet PC to a stylus pen by virtue of capacitive coupling. Such a wireless power transfer method based on capacitive coupling may not be used for the technology disclosed in Patent Document 1. This is because a possibility of wireless power transfer by capacitive coupling is significantly low since resistance of electrode lines of a touch panel is high.

That is, in the case where a coil of a resonance circuit required for electromagnetic energy transmission is configured with electrode lines of a touch panel, a resistance component of the electrode lines of the touch panel is large, and thus energy is dissipated as thermal energy in space due to resistance before the circuit enters a resonance state, and, as a result, the circuit does not resonate.

A reason for high resistance of the electrode lines of the touch panel is that a limited material such as an ITO film is used for the electrode lines since a material for the electrode line should have high light transmissivity and should be cheap.

Furthermore, since it degrades a commercial value of a smartphone or a tablet PC to configure an additional element such as a power transmission device for wirelessly transferring power, embodiments provide a device and method for overcoming such a limitation.

In one embodiment, a touch panel includes an electrostatic sensor unit in which a plurality of TX lines and RX lines intersect with each other to detect a touch position electrostatically, and a power supply unit configured to selectively apply an AC voltage to the TX lines and the RX lines to induce capacitive coupling between an external LC circuit and the electrostatic sensor unit.

In another embodiment, a touch panel for use in a touch screen includes a plurality of TX lines arranged as driving electrodes, a plurality of RX lines arranged as sensing electrodes, the RX lines intersecting with the TX lines, a first voltage source configured to generate a pulse voltage to be transferred to the TX lines, a second voltage source configured to generate an AC voltage to be selectively transferred to the TX lines and the RX lines, and a signal receiving unit configured to process a signal transferred from the TX lines or the RX lines.

By virtue of a touch panel of an embodiment, it is not required to additionally configure a circuit for transmitting power to a pen in a touch-based smart device such as a smartphone or a tablet PC, and thus the thickness of the smart device may be reduced.

Furthermore, it is sufficient to simply add, to a circuit of a touch panel, a circuit for wireless power transmission and to set a frequency of a voltage source for supplying an AC voltage to TX lines and RX lines of the touch panel at a lower frequency than a cutoff frequency, and thus a circuit structure may be simplified.

DETAILED DESCRIPTION OF THE EMBODIMENTS

Embodiments relate to a touch panel provided with a circuit for supplying power to another device by capacitive coupling. For example, a capacitive coupling touch panel may provide power to a stylus pen by capacitive coupling. In order to enable power supply to another device (stylus pen) by capacitive coupling, a power receiving device (stylus pen) should be provided with capacitance.

Figure 1:
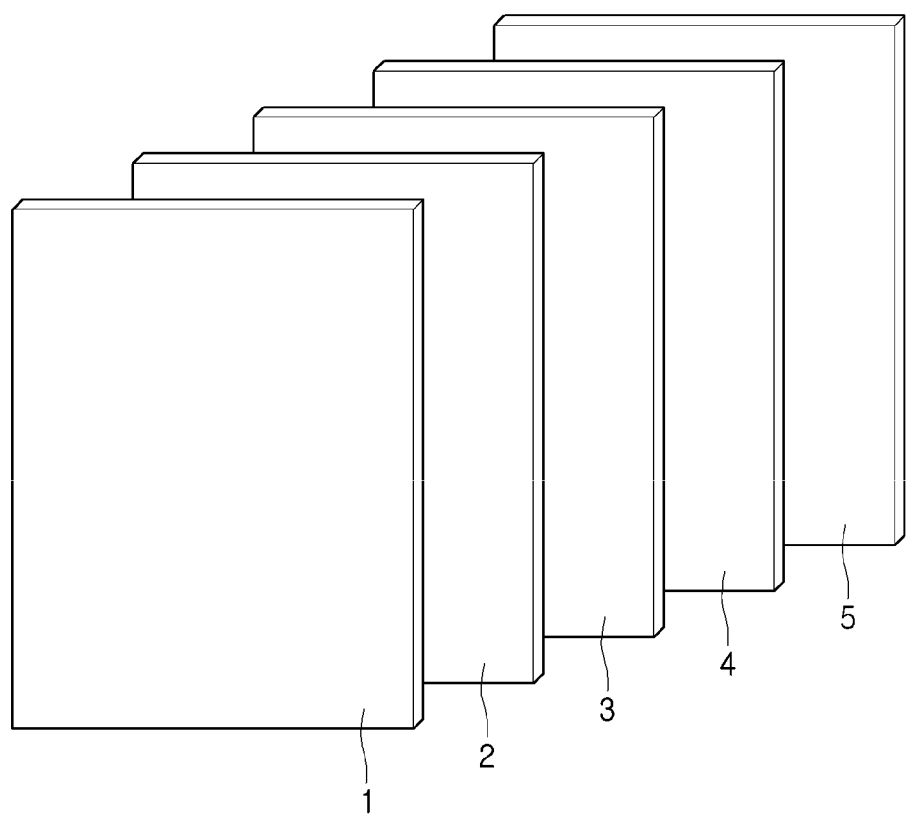
FIG. 1 is a diagram illustrating a configuration of a touch-based device provided with a circuit for transferring power to the outside.
Figure 2:
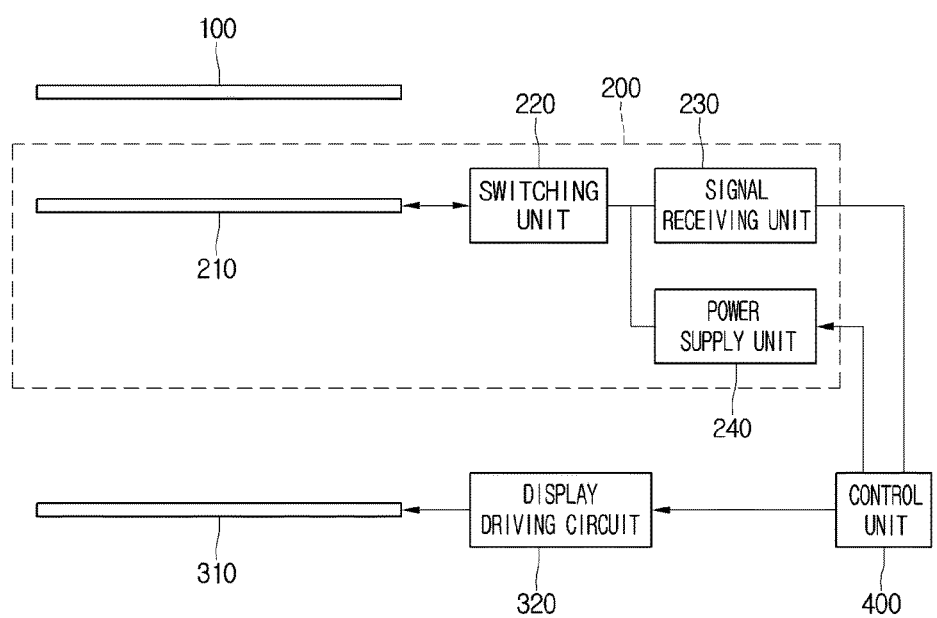
FIG. 2 is a diagram illustrating a configuration of a position detecting device including a touch panel according to an embodiment.

FIG. 2 is a diagram illustrating a configuration of a position detecting device including a touch panel according to an embodiment.

In the position detecting device according to the embodiment, an operation of supplying power to an external power reception side (a stylus pen, etc.) is performed by a touch panel. The touch panel may detect a contact position of a user's finger or a stylus pen electrostatically, and, by virtue of this operation of the touch panel, a voltage may be transferred to a reception side including a capacitor by capacitive coupling.

Referring to FIG. 2, the position detecting device according to the embodiment includes a touch panel 200 for electrostatically recognizing a touch of a user's finger or a pen, a display panel 310 for displaying an image, and a control unit 400 for controlling touch position detection by the electrostatic position detecting unit 200 and power supply to the outside.

The touch panel 200 is an electrostatic position detecting unit, and a protective cover 100 may be additionally disposed on the touch panel 200 to protect the panel from a touch of a user or a pen.

In detail, the touch panel 200 includes an electrostatic sensor unit 210 and a signal receiving unit 230 for processing an electrostatic signal. Furthermore, the touch panel 200 includes a power supply unit 240 for supplying power to the outside by capacitive coupling and a switching unit 220.

The electrostatic sensor unit 210 includes an indium tin oxide (ITO) film and a plurality of transparent electrodes configured with sensors of a grid or matrix structure arranged in a first direction and a second direction intersecting with the first direction.

The transparent electrodes detect a position of a touch of a finger or a pen in a detection area of a device such as a smartphone, a tablet PC, or the like. The signal receiving unit 230 serves to process an electric signal obtained by the electrostatic sensor unit 210.

The touch panel 200 scans the detection area by supplying a voltage to an electrode line of the touch panel from the power supply unit 240, so as to detect a touch position of a finger or a pen. Furthermore, an electric signal obtained through scanning is processed by the signal receiving unit 230, so that the control unit 400 may detect the touch position of a user's finger or a pen.

In particular, in the present embodiment, the power supply unit 240 includes a plurality of sources to supply power to the outside by inducing capacitive coupling. Furthermore, the device of the embodiment further includes the switching unit 220 for selecting a voltage source to be connected to the electrostatic sensor unit 210 from among a plurality of voltage sources of the power supply unit 240.

A configuration of wireless power transfer by capacitive coupling is described below in more detail with reference to the accompanying drawings, in conjunction with detection of a touch position through the electrostatic sensor unit, i.e., the touch panel of the embodiment.

Although touch position detection based on an electrostatic capacitive method (electrostatic method) is described with respect to the present embodiment, it would be possible to detect a position of a touch of a finger or a pen using another method. For example, various known methods such as a resistive method, an optical method, and an ultrasonic method may be used for the touch panel 200.

The display panel 310 is disposed under the electrostatic sensor unit 210, wherein various displays such as an LCD, an OLED, etc. may be used as the display panel 310. Furthermore, a display driving circuit 320 for transferring a video signal to the display panel 310 may be provided, and may enable displaying of an image and screen driving by a touch in response to control by the control unit 400.

Figure 3:
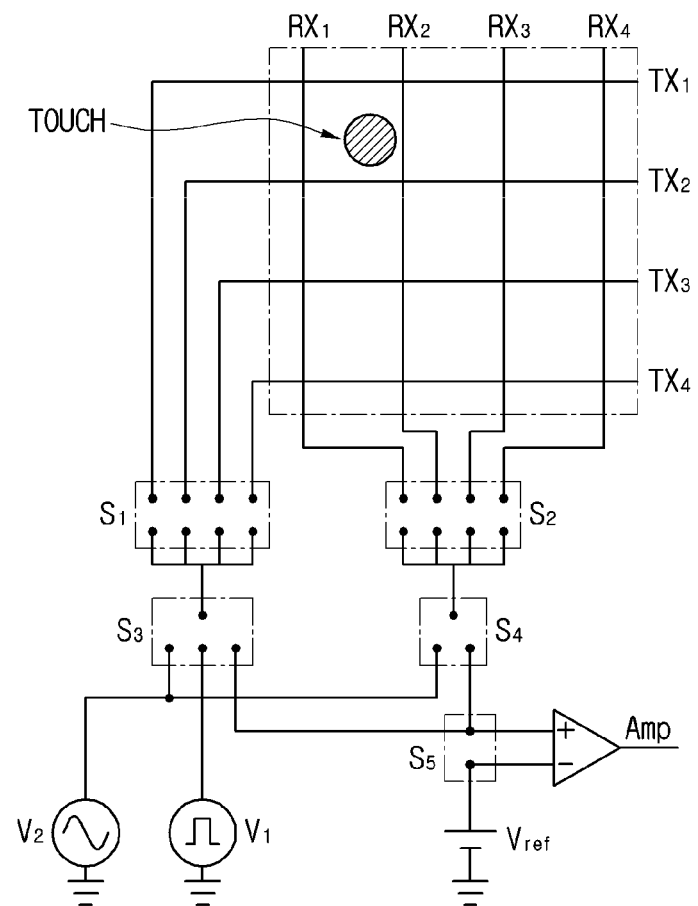
FIG. 3 is a diagram illustrating a configuration of a touch panel of the embodiment.
Figure 4:
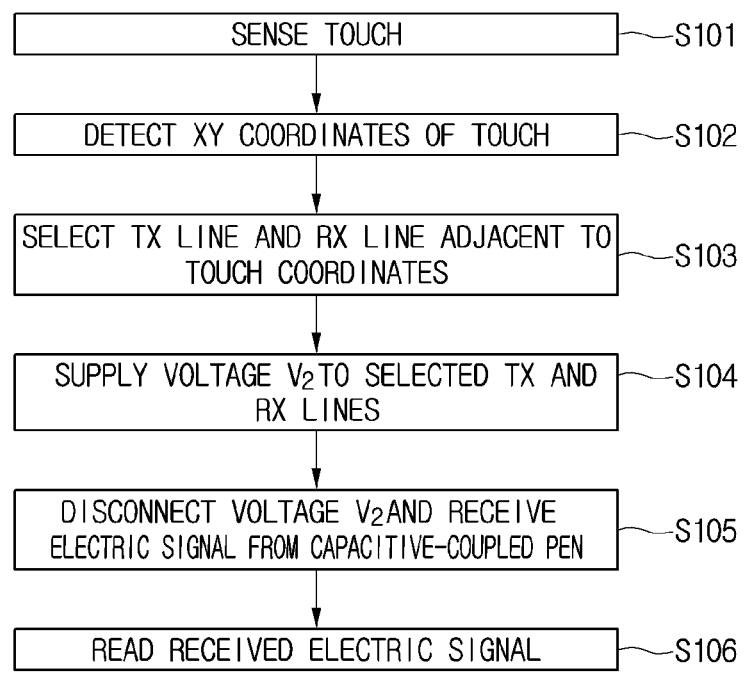
FIG. 4 is a flowchart illustrating a method for supplying wireless power through the touch panel according to the embodiment.

FIG. 3 is a diagram illustrating a configuration of a touch panel of the present embodiment, and FIG. 4 is a flowchart illustrating a method for supplying wireless power through the touch panel according to the present embodiment.

FIG. 3 illustrates four vertical electrode lines and four horizontal electrode lines installed in the touch panel for simple illustration.

The touch panel is provided with a plurality of driving electrodes TX and sensing electrodes RX arranged in a grid or matrix form, and FIG. 3 illustrates that the driving electrodes TX and the sensing electrodes RX are arranged in a horizontal direction (first direction) and a vertical direction (second direction) respectively.

Furthermore, electrode lines RX1 to RX4 and TX1 to TX4 arranged vertically and horizontally are connected to a first switch $S_1$ and a second switch $S_2$ of the switching unit 220. The first switch $S_1$ is connected to a third switch $S_3$ connected to a plurality of voltage sources $V_1$ and $V_2$, and the second switch $S_2$ is connected to a fourth switch $S_4$ connected to the signal receiving unit 230. The fourth switch S4 may selectively connect an RX line of the touch panel to an input terminal of an analog amplifier of the signal receiving unit or to the second voltage source $V_2$ for generating an AC voltage.

Furthermore, a fifth switch $S_5$ is further added to stabilize operation of the analog amplifier by selectively applying a $V_{ref}$ power to all input terminals of the analog amplifier.

Here, the first switch $S_1$ and the second switch $S_2$ serve as an address decoder for turning on/off a switch according to a combination of XY addresses. For example, one switch for selection is required for a combination of one address of an X electrode line, but two switches are required for selecting a decoder of the embodiment. Relevant detailed description will be provided later.

Meanwhile, the third to fifth switches $S_3$ to $S_5$ are switch devices for making one selection according to a signal generated by the control unit 400. That is, the third switch $S_3$ is switched to selectively connect TX lines of the touch panel to the first voltage source $V_1$, the second voltage source $V_2$, or the input terminal of the analog amplifier. That is, the third switch $S_3$ may connect the TX electrode lines of the touch panel to the first voltage source $V_1$ for providing a voltage to the TX lines as a surface wave for recognizing touch coordinates or to the second voltage source $V_2$ for providing an AC voltage to the TX and RX lines so as to induce capacitive coupling between the touch panel and a stylus pen. Furthermore, the third switch S3 may connect the TX electrode lines of the touch panel to the input terminal of the analog amplifier which is an element of the signal receiving unit.

The fourth switch $S_4$ is switched to selectively connect the RX lines of the touch panel to the input terminal of the analog amplifier or to the second voltage source $V_2$.

The first voltage source $V_1$ which is a TX line drive pulse generator corresponds to a TX drive circuit of a typical touch panel. Applying the first voltage source $V_1$ to a TX line to perform scanning, and transferring a signal output from an RX line to the input terminal of the analog amplifier to detect X and Y coordinates of a touch position are the same operations as those of a known touch sensing circuit.

The analog amplifier Amp amplifies and reads a touch signal voltage and is the same as that of a typical touch panel.

In particular, as described above, the second voltage source V2 is used to transfer power to a stylus pen.

FIG. 3 does not illustrate an entire stylus pen for detecting a touch position electrostatically, but only illustrates a contact portion of the touch panel in circle. The stylus pen includes an LC circuit to receive power through capacitive coupling between the touch panel and the stylus pen and store the received power according to the present embodiment.

Figure 8:
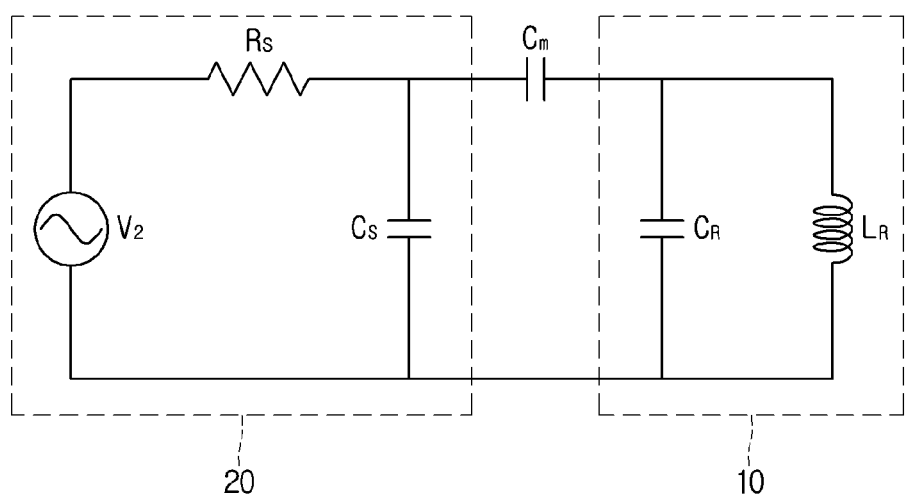
FIG. 8 is a diagram illustrating an equivalent circuit of a transmission side for describing capacitive coupling of the embodiment.

That is, FIG. 8 illustrates a circuit configuration for inducing capacitive coupling, including a transmission side circuit 20 of the touch panel and a reception side circuit 10 of the stylus pen. Therefore, power transferred by capacitive coupling is stored in the LC circuit in the stylus pen.

Simply describing the transmission side circuit of the touch panel, the transmission side circuit includes $R_S$ and $C_S$ together with $V_2$, wherein $R_S$ and $C_S$ respectively represent a resistance component and a stray capacitance component of transparent electrode lines (TX and RX lines) of the touch panel.

The LC circuit starts to resonate when electric energy which oscillates at the same frequency as a resonance frequency of the LC circuit is received from the outside. The electric energy is consumed in the case where the resonance does not occur, but energy consumption is zero in a resonance state. That is, in the resonance state, energy received from the outside oscillates between L and C of the stylus pen while being confined therebetween, thereby maintaining the resonance state.

A method for supplying power from the touch panel to the stylus pen corresponding to a reception side will be described in detail with reference to FIG. 4. Furthermore, operation of the touch panel illustrated in FIGS. 5 to 7 will be described in conjunction with the description of FIG. 4.

The stylus pen for receiving power holds electric energy in a resonance state, and transfers the electric energy back to the touch panel when power supply from the touch panel is stopped. Here, the touch panel receives, as an electric signal, the electric energy transferred from the stylus pen, and the touch panel and the control unit analyze a frequency of the received electric signal so as to detect a writing pressure of the stylus pen (which may be referred to as a pen pressure and represent a pressure applied to a pen by a user).

Operation of the first to fifth switches of the switching unit 220 is controlled by the control unit 400 according to a mode of the touch panel. For example, the first to fifth switches are controlled so that the TX lines and the RX lines are respectively connected to different elements in an electrostatic detection mode for detecting a touch position and a mode for power transmission to the outside.

Firstly, according to the embodiment, sensing a touch is performed by scanning the TX lines and the RX lines of the electrostatic sensor unit of the touch panel (S101), and XY coordinates of a touch position are detected (S102).

Figure 5:
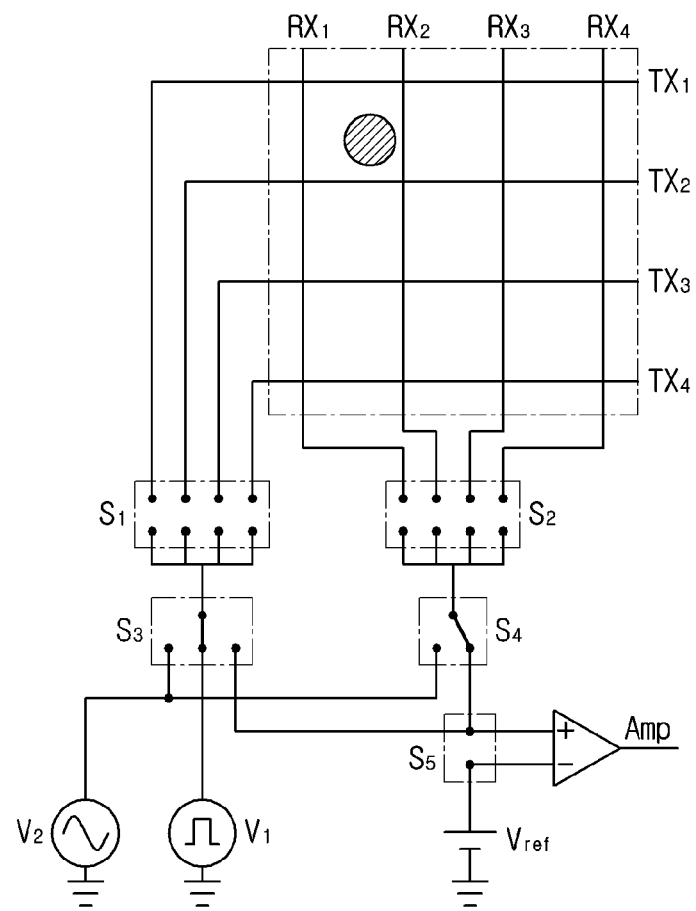
FIGS. 5 to 7 are diagrams illustrating a configuration of a touch panel operating according to a first embodiment.

During this process of recognizing the touch position, the touch panel 200 performs output signal checking and voltage supply through line scanning like a typical touch panel, and the switching unit is operated as illustrated in FIG. 5.

That is, although not illustrated in the drawings, the first switch $S_1$ and the second switch $S_2$ are sequentially connected according to control by the control unit 400, and the third switch $S_3$ connects the TX lines of the touch panel to the first voltage source $V_1$ for generating a pulse signal. Furthermore, the fourth switch $S_4$ connects, to one input terminal of the analog amplifier Amp, an RX signal selected by the second switch $S_2$ corresponding to a decoder. In brief, the first voltage source which is a pulse signal generator is connected to the TX line by a switching operation of the third switch $S_3$, and the RX line is connected to the input terminal of the analog amplifier Amp by a switching operation of the fourth switch $S_4$.

Furthermore, the fifth switch S5 connects the reference signal $V_{ref}$ to another input terminal of the analog amplifier so that an output signal of the RX line is amplified by the analog amplifier Amp.

The above-mentioned connection between the TX line and the first voltage source, connection between the RX line and the input terminal of the analog amplifier, and connection between the other input terminal of the analog amplifier and the reference signal by the third to fifth switches are the same as those of a typical touch position sensing circuit. Therefore, further detailed description about touch position detection is not provided.

According to the switching operation of the switching unit as described above, a position of a touch of a finger or a pen on the touch panel may be detected electrostatically. After the XY coordinates of the touch position are detected, an operation of selecting the TX line and the RX line most adjacent to the touch coordinates is performed (S103).

That is, according to XY coordinate information of a detected touch position, two TX lines and two RX lines most adjacent to the touch position are selected. In the case of FIG. 3 or FIG. 5, TX lines TX1 and TX2 and RX lines RX1 and RX2 correspond to the most adjacent electrode lines.

Thereafter, the four selected electrode lines, i.e., a process of supplying power to the TX lines TX1 and TX2 and the RX lines RX1 to RX2 is performed (S104).

Figure 6:
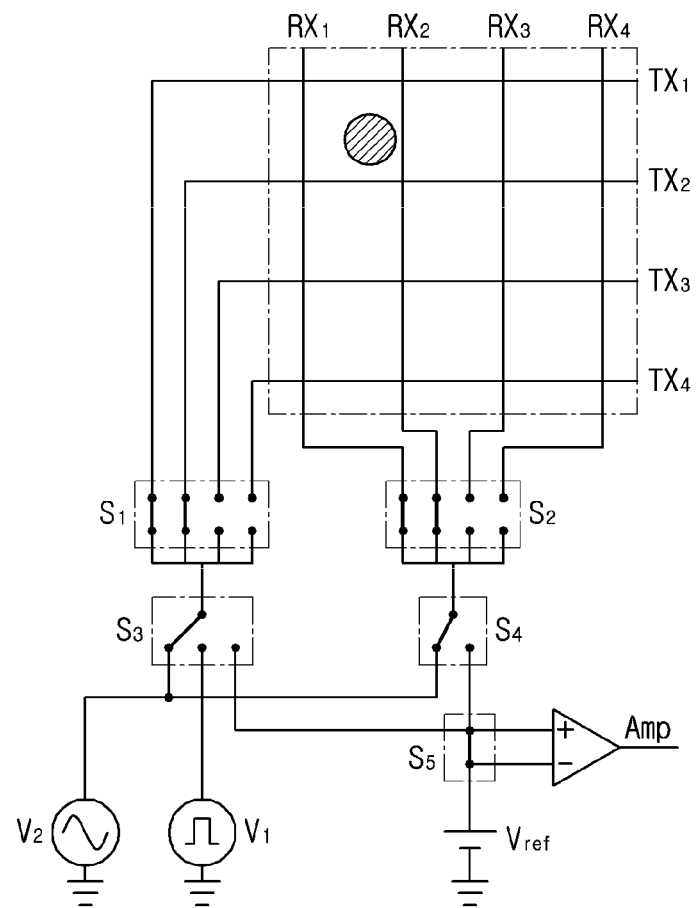

FIG. 6 illustrates a switching state of the switching unit when power is supplied to two TX lines and two RX lines.

The first switch S₁ connects two TX lines selected as power supply lines to the third switch S₃. The second switch S₂ connects two RX lines selected as power supply lines to the fourth switch S₄.

The third switch S₃ connects, to the second voltage source V₂ for generating an AC voltage, the two TX lines connected by the first switch S₁. The fourth switch S₄ is switched to connect the RX lines of the touch panel to the second voltage source V₂, so that the AC voltage transferred from the second voltage source V₂ may be transferred to the TX lines through the first and third switches and may also be transferred to the RX lines through the second and fourth switches.

Since the analog amplifier is not required to operate in an operation of supplying power to an external stylus pen, the fifth switch S₅ is switched so that both the input terminals of the analog amplifier receive the reference signal, thereby stabilizing operation of the analog amplifier. That is, as illustrated in FIG. 6, the reference signal V$_{ref}$ is provided to both the input terminals of the analog amplifier Amp.

In such a power transmission mode, the AC voltage of V₂ is applied to the TX lines and the RX lines of the touch panel, and the TX lines and the RX lines have the resistance and capacitance of Rs and Cs, so that a transmission side is configured with respect to capacitive coupling as illustrated in FIG. 8.

Described below is a reason for selecting two TX lines and two RX lines most adjacent to a touch position detected electrostatically and supplying the same AC voltage to the four electrode lines according to a first embodiment.

A power supply principle of the present disclosure is based on a method of supplying electromagnetic energy by capacitive coupling. A distance between electrodes of a capacitor Cm forming capacitive coupling is very short compared to a wavelength of a generated electromagnetic wave. In this case, an electric field is similar to an electrostatic field. Therefore, capacitance which is one of measures of the quantity of electricity may be defined, and a typical AC theory may be applied to analysis on operation of a circuit. Cm represents mutual capacitance formed between an electrode line (touch panel) of the power transmission side and an electrode of the power reception side (stylus pen).

Regarding only one electrode line of the power transmission side, for example, the TX line TX1, it is assumed that a center of the electrode of the power reception side is on a center line of the TX line TX1. Here, a mutual capacitance C$_{m\_TX1}$ between the electrode of the power reception side and the TX line TX1 is maximized. However, a value of the mutual capacitance C$_{m\_TX1}$ gradually decreases as the center of the electrode of the power reception side moves from the center line of the TX line TX1 towards the TX line TX2. The reduced capacitance value becomes a mutual capacitance C$_{m\_TX2}$ between the TX lines TX2 and the electrode of the power reception side. Therefore, considering the sum of the mutual capacitance between the TX line TX1 and the electrode of the power reception side and the mutual capacitance between the TX line TX2 and the electrode of the power reception side, the total mutual capacitance is maintained constant wherever the electrode of the power reception side is positioned between the TX lines TX1 and TX2.

The total mutual capacitance is also maintained constant with respect to the RX lines RX1 and RX2. That is, in the case where the center of the electrode of the power reception side is on a center line of the RX line RX1, a mutual capacitance C$_{m\_Rx1}$ between the electrode of the power reception side and the RX line RX1 is maximized.

Therefore, in the case where the center of the electrode of the power reception side is positioned within an area surrounded by the TX lines TX1 and TX2 and the RX lines RX1 and RX2, the mutual capacitance between the power transmission side and the power reception side is maintained constant wherever the electrode of the power reception side is positioned, when the same AC voltage is applied to the four electrode lines. Therefore, since it is not required to consider a change in the mutual capacitance, a condition for transmitting electric energy is constant, and, as a result, control of wireless power transmission using the RX lines and the TX lines of the touch panel may be performed with ease.

A power supply principle is described in detail below.

Although the same AC voltage is supplied to the four electrode lines TX₁, TX₂, RX₁, and RX₂, this principle will be described with reference to FIG. 8 illustrating an equivalent electric circuit in which those electrode lines are illustrated as one electrode line for ease of description.

Since a resistance R and a capacitance C equivalently represent four electrode lines, each line has a value of one fourth of a resistance with respect to R$_S$, and each line has a value of four times a capacitance with respect to C$_S$. Such an RC circuit operates as a low-pass filter. Therefore, a signal with a low frequency passes through the RC circuit without signal attenuation, but a signal with a high frequency is attenuated while passing through the RC circuit.

A frequency at which attenuation becomes prominent is referred to as a cutoff frequency (−3 dB attenuation of voltage, i.e., 30% down), and is expressed as Mathematical Expression 1.

$$f_H = \frac{1}{2\pi R_S C_S} \quad \text{Mathematical Expression 1}$$

Furthermore, in the embodiment, a frequency lower than such a cutoff frequency is used as a frequency f$_S$ of the AC power supply voltage V₂. That is, a frequency satisfying Mathematical Expression 2 is used.

$$f_S < \frac{1}{2\pi R_S C_S} \quad \text{Mathematical Expression 2}$$

In the embodiment, Mathematical Expression 2 represents an upper limit of a circuit operating frequency.

The power transmission side transmits electric energy to the power reception side by virtue of capacitive coupling. The reception side accumulates the received electric energy in an LC circuit. Upon receiving the electric energy from the outside, the LC circuit starts to resonate with zero consumption of energy.

That is, when the LC circuit of the power reception side is in a resonance state, the electric energy from the outside is confined in the LC circuit and oscillates between L and C without energy loss, thereby maintaining the resonance state. However, in actual practice, the energy is gradually consumed due to existence of a resistance component, and, as a result, an amplitude of an oscillation energy is attenuated and becomes extinct.

In the case of the embodiment, since the electric energy is constantly supplied from an AC power supply installed at a touch panel side, the resonance state of the LC circuit of the stylus pen may continue unless as long as the electric energy is supplied from the touch panel side. However, the LC circuit does not endlessly accumulate the energy supplied from the touch panel side. For example, in the case of a configuration of capacitive coupling of the embodiment, energy is not able to be transferred to the power reception side any more when a voltage amplitude of the power transmission side is equal to that of the LC circuit of the power reception side. That is, when voltages on both sides of a coupling capacitance are equal to each other, energy supply is stopped and an equilibrium state is brought about.

When the power transmission side supplies electric energy at a frequency matched to the resonance frequency of the LC circuit, the electric energy may be efficiently accumulated in the LC circuit.

That is, $$f_S = \frac{1}{2\pi\sqrt{L_R C_R}}$$ Mathematical Expression 3

In order to accumulate a larger amount of electric energy in the LC circuit, a capacitance component $C_R$ of the LC circuit may be increased. However, if a value of the capacitance component $C_R$ is increased excessively, a time taken to arrive at the equilibrium state becomes longer. On the contrary, if the value of the capacitance component $C_R$ is too small, a signal transmitted from the power reception side to the power transmission side through the mutual capacitance Cm may be attenuated so as to be outside a range of signals readable by the analog amplifier within a short time, and thus it may be difficult for the analog amplifier to detect a signal. Therefore, it is required to set a $C_R$ value for securing a time for stably sensing a signal by the analog amplifier in the case where a signal is transmitted from the pen which is a reception side to the touch panel which is a transmission side. Such a $C_R$ value may be variously changed according to an environment of the touch panel.

A next process is described below with reference back to FIG. 4.

After the power transmission based on capacitive coupling is performed by applying the AC voltage to the selected TX line and RX line, the touch panel 200 receives a signal transmitted from the stylus pen which is the power reception side (S105). That is, the stylus pen which is the power reception side transmits an electric signal to the touch panel of the power transmission side.

Figure 7:
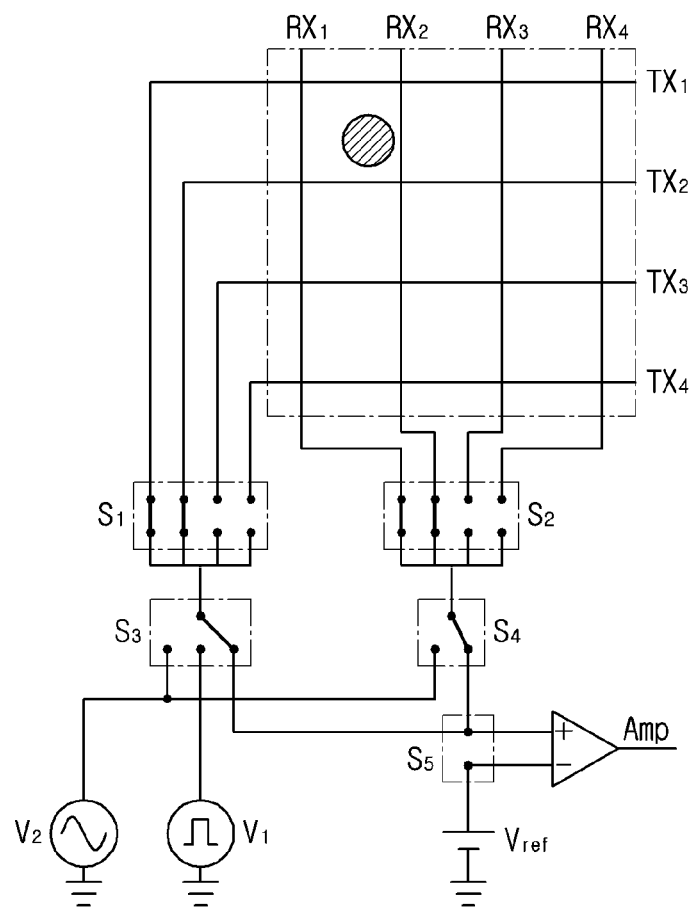

Here, the switches of the switching unit 220 of the touch panel are changed in terms of a connection state as illustrated in FIG. 7.

That is, the first and second switches $S_1$ and $S_2$ maintain a state in which the TX and RX lines selected at the time of power transmission are connected to the third switch $S_3$ and the fourth switch $S_4$. Furthermore, the fifth switch $S_5$ disconnects a positive (+) input terminal of the analog amplifier Amp from the reference signal $V_{ref}$ and connects the third and fourth switches $S_3$ and $S_4$ to the positive (+) input terminal of the amplifier Amp, so that an electric signal transferred from the touch panel is amplified and read. Moreover, the third and fourth switches $S_3$ and $S_4$ respectively connect the first and second switches $S_1$ and $S_2$ to the positive (+) input terminal of the analog amplifier Amp, so that the touch panel side is disconnected from the second voltage source $V_2$. Therefore, electric energy supply by the second voltage source is stopped.

When the switches are in the above-mentioned states, the electric energy accumulated in the LC circuit of the stylus pen side returns back to the touch panel side as an electric signal through the mutual capacitance Cm, while maintaining oscillation of a resonance frequency. That is, the electric energy becomes an electric signal transferred from the stylus pen.

Here, it is assumed that there occurs a slight difference between the resonance frequency of the LC circuit and the frequency $f_S$ of the second voltage source $V_2$ of the power transmission side, provided that a value of C of the stylus pen is $C_R+\Delta C$ as expressed by Mathematical Expression 4 below. Even in this case, when electric energy is transferred from the touch panel to the stylus pen, a signal of the LC circuit oscillates at a frequency slightly different from the resonance frequency by virtue of input of energy. Here, if the input energy is put into the LC circuit, the LC circuit returns to a resonance frequency oscillation state so as to minimize power consumption of the LC circuit, and the input energy is also maintained within the LC circuit.

$$f_R = f_S - \Delta f = \frac{1}{2\pi\sqrt{L_R(C_R + \Delta C)}}$$ Mathematical Expression 4

By repeating this process, the electric energy supplied from the touch panel is accumulated in the LC circuit of the stylus pen.

From the above description, it would be obvious that even if the frequency of the second voltage source $V_2$ of the touch panel does not match the resonance frequency of the stylus pen, energy transferred from the touch panel is accumulated in the LC circuit of the stylus pen.

Therefore, a constant of the LC circuit of the stylus pen may be variously selected. Furthermore, by virtue of a configuration in which electric energy for inducing resonance of the LC circuit is transferred from the second voltage source $V_2$ of the touch panel having a fixed frequency, if electric energy supply from the touch panel is stopped, the touch panel side may receive electric signals of various frequencies from the stylus pen.

For example, if the stylus pen is provided with a plurality of switches having a structure which enables selection of resonance frequencies of different LC constants for each switch, it may be detected what switch is pressed in the stylus pen every time energy supply from the touch panel is stopped. That is, in the case where a command to be executed is pre-assigned to each switch of the stylus pen, when the user presses a switch of the stylus pen, a command corresponding to the switch may be transferred to the touch panel.

Furthermore, it may also be possible to check a pen pressure (pressure applied to the pen by the user) by changing a capacitance C in the LC circuit of the pen capable of transferring/receiving electric energy to/from the touch panel by virtue of capacitive coupling.

That is, in the case where a value of the capacitance C may be changed according to the pen pressure applied by the user, a degree of the pen pressure may be detected by receiving an electric signal from the pen through the analog amplifier of the touch panel. For example, when the value of the capacitance C is changed in the LC circuit according to a pressured applied to the pen by the user, a frequency of an electric signal transferred from the pen back to the touch panel may be checked so as to execute a command corresponding to the pen pressure.

Figure 9:
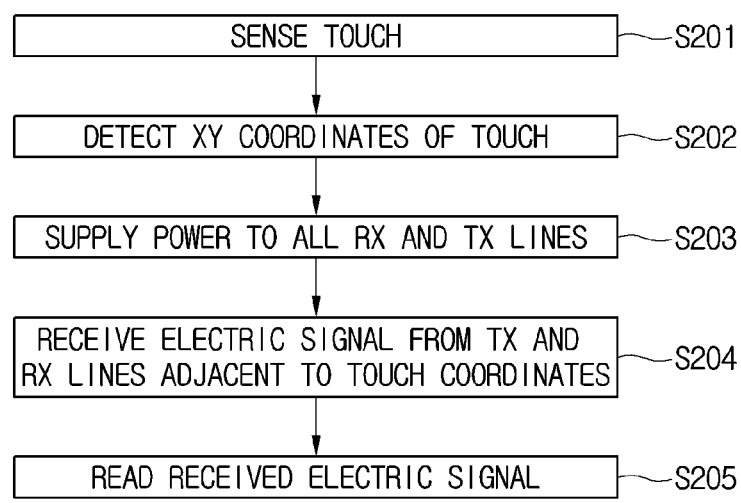
FIG. 9 is a flowchart illustrating a method for supplying wireless power through the touch panel according to a second embodiment.

Operation of a touch panel according to a second embodiment is described below. FIG. 9 is a flowchart illustrating a method for supplying wireless power through the touch panel according to the second embodiment.

The touch panel operation of the first embodiment illustrated in FIG. 4 may be divided into an electrostatic touch sensing mode (S101-S103), a power supply mode (S104), and an electric signal receiving mode (S105, S06) of the pen according to a connection state of the switches of the switching unit.

The flowchart illustrated in FIG. 9 may also be divided into an electrostatic touch sensing mode (S201-S202), a power supply mode (S203), and an electric signal receiving mode (S204, S205) of the pen.

However, unlike the first embodiment, an AC voltage is supplied to all TX lines and RX lines for the purpose of quick power supply instead of supplying power only to some TX lines and RX lines, in the power supply mode in which the AC voltage is supplied to the TX lines and the RX lines of the touch panel.

Described below is a method for wirelessly providing power by virtue of capacitive coupling using the touch panel and the LC circuit of the pen according to the second embodiment.

In a state where the switch connection state illustrated in FIG. 5 is maintained as the electrostatic touch sensing mode as in the first embodiment, sensing a touch is performed by scanning the TX lines and the RX lines of the touch panel (S201), and XY coordinates of a touch position are detected (S202).

Thereafter, both the third switch $S_3$ and the fourth switch $S_4$ are connected to the second voltage source $V_2$ for supplying an AC voltage, in order to supply power to the touched pen. Furthermore, the first switch $S_1$ and the second switch $S_2$ are switched so that all the TX lines and RX lines are connected to the third switch $S_3$ and the fourth switch $S_4$, thereby connecting all the TX lines and RX lines to the second voltage source $V_2$ (S203). As described above with reference to FIG. 6, when the same AC voltage is applied to the TX lines and the RX lines, the mutual capacitance between the power transmissions side and the power reception side may be maintained constant wherever the electrode of the power reception side is positioned.

Figure 10:
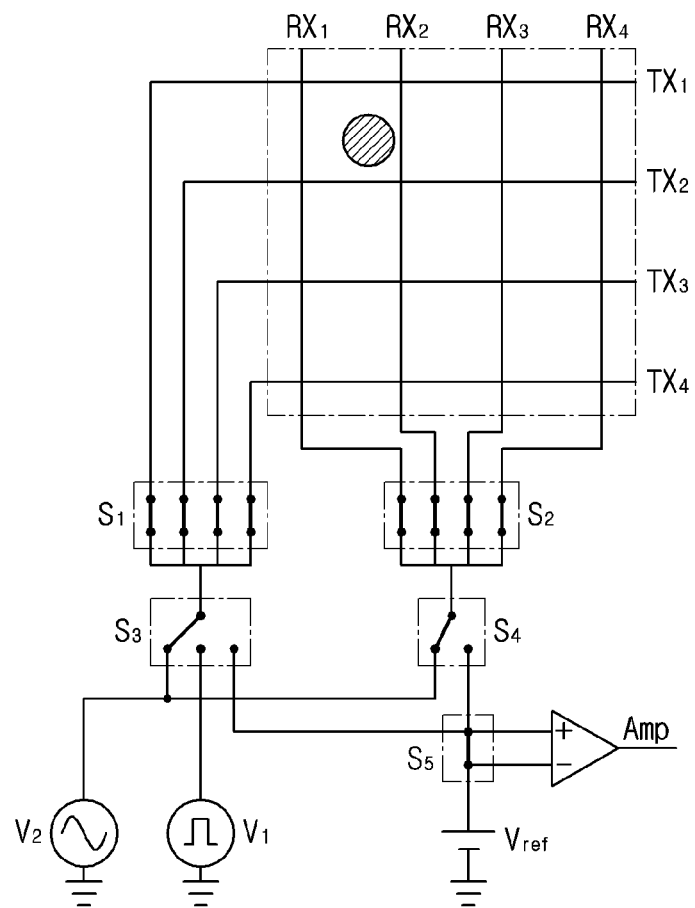
FIG. 10 is a diagram illustrating operation of the touch panel according to the second embodiment.

Therefore, since it is not required to consider a change in the mutual capacitance, the AC voltage may be applied to all the RX lines and TX lines to quickly supply power to the stylus pen side, after checking occurrence of a touch and coordinates thereof electrostatically. This process may be performed more quickly than that of the case in which the AC voltage is supplied to only specific lines as in the first embodiment. A circuit configuration for supplying the AC voltage to all the TX lines and RX lines is illustrated in FIG. 10.

After the AC voltage is applied to all the TX lines and RX lines in this manner, a switch configuration of the touch panel may be changed so as to receive electric energy transferred from the stylus pen. Here, two TX lines and two RX lines most adjacent to the touch position coordinates are connected to the analog amplifier so that a frequency of the electric signal transferred from the stylus pen may be accurately detected. That is, the first to fifth switches $S_1$ to $S_5$ may be connected as illustrated in FIG. 7, and a signal transferred through the TX line, among electric signals transferred from the stylus pen, is transferred to the analog amplifier via the first, third, and fifth switches, and a signal transferred through the RX line is transferred to the analog amplifier via the second, fourth, and fifth switches (S204).

Thereafter, a frequency is detected from a signal processed by the analog amplifier, and various operations are performed according to a user command corresponding to the detected frequency (S205).

According to the power transfer method of the present embodiment as described above, it is not required to additionally configure a circuit for transmitting power to a pen in a touch-based device such as a smartphone or a tablet PC, and thus the thickness of the touch-based device may be reduced. Furthermore, it is sufficient to simply add, to a circuit of a touch panel, a circuit for wireless power transmission and to set a frequency of a voltage source for supplying an AC voltage to TX lines and RX lines of the touch panel at a lower frequency than a cutoff frequency, and thus a circuit structure may be simplified.

INDUSTRIAL APPLICABILITY

The embodiments are applicable to a device including a touch panel and a pen capable of receiving power from the device, and are thus industrially applicable.

The invention claimed is:

1. A touch panel comprising:
an electrostatic sensor unit in which a plurality of driving electrodes and sensing electrodes intersect with each other to detect a touch position electrostatically; and
a power supply unit configured to selectively apply an AC voltage to the driving electrodes and the sensing electrodes to induce capacitive coupling between an external LC circuit and the electrostatic sensor unit,
wherein the power supply unit comprises:
a first voltage source configured to generate a pulse voltage to be applied to the driving electrodes; and
a second voltage source configured to generate the AC voltage to be applied to the driving electrodes and the sensing electrodes, and
wherein the touch panel further comprises:
a first switching unit configured to selectively connect the first voltage source or the second voltage source to the driving electrodes, and
a second switching unit configured to connect or disconnect the second voltage source to the sensing electrodes,
wherein, in order to transfer power to the LC circuit,
the first switching unit connects the second voltage source to the driving electrodes,
the second switching unit connects the second voltage source to the sensing electrodes,
two driving electrodes and two sensing electrodes are selected from among the plurality of driving electrodes and sensing electrodes,
the first switching unit connects the two driving electrodes to the second voltage source, and
the second switching unit connects the two sensing electrodes to the second voltage source, and
wherein the two driving electrodes and the two sensing electrodes are the most adjacent to the touch position.

2. The touch panel according to claim 1, wherein the first switching unit connects the first voltage source to the driving electrodes to detect the touch position.

3. The touch panel according to claim 1, wherein, after power transfer to the LC circuit is performed by connecting the second voltage source to the driving electrodes and the sensing electrodes, a predetermined driving electrode and a predetermined sensing electrode from among the driving electrodes and the sensing electrodes are connected to an analog amplifier to receive an electric energy transferred from the LC circuit.

4. The touch panel according to claim 3, wherein the predetermined driving electrode and the predetermined sensing electrode connected to the analog amplifier are two driving electrodes and two sensing electrodes most adjacent to the touch position electrostatically detected.

5. A touch panel for use in a touch screen, comprising:
a plurality of TX lines arranged as driving electrodes;
a plurality of RX lines arranged as sensing electrodes, the RX lines intersecting with the TX lines;
a first voltage source configured to generate a pulse voltage to be transferred to the TX lines;
a second voltage source configured to generate an AC voltage to be selectively transferred to the TX lines and the RX lines;
a signal receiving unit configured to process a signal transferred from the TX lines or the RX lines;
a first switch configured to selectively connect the first voltage source, the second voltage source, or the signal receiving unit to the TX lines; and
a second switch configured to selectively connect the second voltage source or the signal receiving unit to the RX lines,
wherein the signal receiving unit comprises an analog amplifier, and
wherein, when the first switch or the second switch is connected to the second voltage source, a same reference voltage is applied to two input terminals of the analog amplifier.

6. The touch panel according to claim 5, further comprising:
a third switch disposed between the first switch and the TX lines to selectively connect the TX lines to the first switch.

7. The touch panel according to claim 6, further comprising:
a fourth switch disposed between the second switch and the RX lines to selectively connect the RX lines to the second switch.

8. The touch panel according to claim 5,
wherein a switch is provided to the input terminals of the analog amplifier, and
wherein the switch inputs a reference voltage to both the input terminals of the analog amplifier, or inputs signals transferred from the TX lines and the RX lines to a positive terminal of the analog amplifier and inputs the reference voltage to a negative terminal of the analog amplifier.

9. The touch panel according to claim 5, further comprising:
a third switch disposed between the first switch and the TX lines to selectively connect the TX lines to the first switch;
a fourth switch disposed between the second switch and the RX lines to selectively connect the RX lines to the second switch; and
a fifth switch disposed at input terminals of the signal receiving unit to switch an input signal of the signal receiving unit.

10. The touch panel according to claim 9, wherein, when the first switch or the second switch is connected to the second voltage source, the third switch connects all the TX lines or two specific TX lines to a side of the first switch.

11. The touch panel according to claim 9, wherein, when the first switch or the second switch is connected to the second voltage source, the fourth switch connects all the RX lines or two specific RX lines to a side of the second switch.

12. The touch panel according to claim 9,
wherein, when the first switch or the second switch is connected to the second voltage source, the fifth switch applies the reference voltage to the two input terminals of the analog amplifier.

* * * * *